United States Patent
Kagan et al.

(10) Patent No.: US 10,666,701 B2
(45) Date of Patent: May 26, 2020

(54) ADAPTATION OF CONTENT DELIVERY NETWORK TO INCREMENTAL DELIVERY OF LARGE, FREQUENTLY UPDATED DATA SETS

(71) Applicant: Cedexis, Inc., Portland, OR (US)

(72) Inventors: Martin Kagan, Portland, OR (US);
Hasan Alayli, San Francisco, CA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 988 days.

(21) Appl. No.: 13/679,881

(22) Filed: Nov. 16, 2012

(65) Prior Publication Data

US 2014/0143438 A1   May 22, 2014

Related U.S. Application Data

(60) Provisional application No. 61/727,376, filed on Nov. 16, 2012.

(51) Int. Cl.
*H04N 19/46*   (2014.01)
*H04L 29/06*   (2006.01)
*H04L 29/08*   (2006.01)

(52) U.S. Cl.
CPC ...... *H04L 65/607* (2013.01); *H04L 29/06591* (2013.01); *H04L 65/80* (2013.01); *H04L 67/1008* (2013.01); *H04N 19/46* (2014.11)

(58) Field of Classification Search
CPC ............... H04L 65/607; H04L 67/1008; H04L 65/4084; H04L 65/80; H04L 29/06591; H04N 19/46
USPC .......................................................... 709/231
See application file for complete search history.

(56) References Cited

U.S. PATENT DOCUMENTS

| | | | |
|---|---|---|---|
| 7,650,376 B1 * | 1/2010 | Blumenau | H04L 67/1008 709/203 |
| 9,553,844 B2 | 1/2017 | Kagan | |
| 2002/0041570 A1 * | 4/2002 | Ptasinski | H04L 1/0003 370/252 |
| 2004/0093419 A1 | 5/2004 | Weihl et al. | |
| 2006/0095944 A1 * | 5/2006 | Demircin | H04N 19/172 725/81 |
| 2006/0225093 A1 * | 10/2006 | Huttunen | H04N 21/235 725/39 |
| 2008/0227467 A1 * | 9/2008 | Barnes | G06Q 30/0259 455/456.2 |

(Continued)

FOREIGN PATENT DOCUMENTS

WO   2014078717 A2   5/2014

OTHER PUBLICATIONS

Barracuda Networks. Internet Reliability and Bandwidth Optimization with the Barracuda Link Balance, Release 1. Aug. 2009. 3 pages.

(Continued)

*Primary Examiner* — Emmanuel L Moise
*Assistant Examiner* — Xiang Yu
(74) *Attorney, Agent, or Firm* — Klarquist Sparkman, LLP (57) ABSTRACT

The technology disclosed relates to delivering frequently updated data to computing devices that make decisions about selection of resources that might be delivered in response to a request from a user. In particular, it relates to utilizing media content delivery networks to deliver non-media data that is useful in the decision-making.

21 Claims, 5 Drawing Sheets

(56) References Cited

U.S. PATENT DOCUMENTS

| | | | |
|---|---|---|---|
| 2009/0135919 A1 | 5/2009 | Vered et al. | |
| 2010/0177773 A1* | 7/2010 | Kolhi | H04L 12/1836 370/390 |
| 2010/0217801 A1 | 8/2010 | Leighton et al. | |
| 2010/0250497 A1 | 9/2010 | Redlich et al. | |
| 2011/0202820 A1 | 8/2011 | Eroz et al. | |
| 2011/0206022 A1* | 8/2011 | Grewe | H04L 1/0083 370/338 |
| 2011/0295983 A1 | 12/2011 | Medved et al. | |
| 2011/0299629 A1* | 12/2011 | Luby | H03M 13/3761 375/299 |
| 2012/0183073 A1 | 7/2012 | Milstein | |
| 2012/0221708 A1 | 8/2012 | Bhardwaj et al. | |
| 2012/0246315 A1 | 9/2012 | Kagan | |
| 2013/0013730 A1* | 1/2013 | Li | H04L 65/80 709/217 |
| 2013/0114625 A1* | 5/2013 | Cunningham | H04L 41/5009 370/469 |
| 2015/0215267 A1 | 7/2015 | Kagan | |
| 2016/0308959 A1* | 10/2016 | Richardson | H04L 67/1004 |

OTHER PUBLICATIONS

IBM. Virtualization Engine Enterprise Workload Manager. Version 2 Release 1. 7th Edition. Jun. 2006. 354 pages.

Salchow Jr, Ken. Load Balancing 101: Nuts and Bolts. White Paper F5 Networks, inc. Jul. 2007. 6 pages.

International Search Report. Application No. PCT/US13/70394, dated May 12, 2014. 18 pages.

Roth, Gregor, "Server Load Balancing Architectures, Part 1: Transport-Level Load Balancing," JavaWorld.com, Oct. 21, 2008, 24 pages.

PCT/US13/70394—International Preliminary Report on Patentability and Written Opinion dated May 19, 2014, 8 pages.

\* cited by examiner

ADAPTATION OF CONTENT DELIVERY NETWORK TO INCREMENTAL DELIVERY OF LARGE, FREQUENTLY UPDATED DATA SETS

RELATED APPLICATIONS

This application is related to and claims the benefit of U.S. Provisional Application No. 61/727,376, filed Nov. 16, 2012, naming the same inventors. The Provisional application is hereby incorporated by reference.

BACKGROUND

The technology disclosed relates to delivering frequently updated data to consumer devices that make decisions about selection of resources that might be delivered in response to a request from a user. In particular, it relates to utilizing media content delivery networks to deliver non-media data that is useful in the decision-making.

Content delivery optimization speeds user access to content via the Internet, enhances user experiences and increases completion of transactions. One overlay of web servers that improves content delivery via the Internet is Content Delivery Networks (CDNs) such as the CDNs provided by Akamai Technologies, Level 3 Communications and Limelight Networks. These CDNs often include edge servers that replicate some functions of original content servers or include key content from those original content servers. Additionally, at the original content servers and within self-managed networks, load balancing can be applied to improve performance of incoming and outgoing channels. Manufacturers of load balancing appliances include F5 Networks, Cisco Systems, and Barracuda Networks. Load balancing systems that operate at the data/transport level (OSI layers 2-3) and application level (OSI layers 4-7) can be applied in many different says. See, e.g., Gregor Roth, "Server load balancing architectures", JavaWorld.com. (Oct. 21, 2008). Of course, open source alternatives are available for implementing both load balancing and CDNs to improve content delivery.

More recently, assignees of this application have described and introduced a further overlay service implemented using the domain name service (DNS) that can, among other features, enable selection among available CDNs. The technology previously disclosed includes instrumentation of web sites to collect real time latency data for competing CDNs. See, WO 2011/056796 A1, "Internet Infrastructure Survey" (May 12, 2011). The technology further includes DNS application servers that select among CDNs when resolving a DNS request for a URL that is supported by multiple CDNs. See, WO 2011/046790 A1, "DNS Application Server" (Apr. 21, 2011). Authoritative or surrogate DNS servers can use the collected survey data to influence or determine infrastructure selection.

An enormous amount of data collection and processing is involved in repeatedly surveying performance. Over a billion data points per day may be received and processed to construct at least one large sparse array, part of which is fed to an authoritative or surrogate DNS server. The sparse array expresses the results of data collection for pairs of sources and destinations.

An opportunity arises to extend the use of repeated performance surveys. Survey results can be distributed to computing devices that can be programmed to make resource selection decisions, using parameter data. The technology disclosed for that purpose also can be applied to content augmentation. Content augmentation can include advertising or augmented reality. Advertising works best when it complements or augments content of interest to a particular user. The technology disclosed can be used to distribute ad content to be cached and displayed in campaigns. Augmented reality uses immediately local data to enhance a user's view of what surrounds them. For instance, augmenting a view of the street with addresses, names of buildings and directories of building occupants. The technology disclosed can be used to distribute reality augmentation data. Better resource selection (e.g., source selection and/or load balancing), more useful content augmentation, and more resilient and transparent components and systems may result.

SUMMARY

The technology disclosed relates to delivering frequently updated data to consumer devices that make decisions about selection of resources that might be delivered in response to a request from a user. In particular, it relates to utilizing media content delivery networks to deliver non-media data that is useful in the decision-making.

Particular aspects of the technology disclosed are described in the claims, specification and drawings.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

The technology disclosed transparently repurposes content delivery networks (CDNs) to distribute up-to-date parameter data to resource selection and load balancing appliances and, more generally, to computing devices of all sorts. For instance, the data can summarize recently measured the performance of point-to-point connections on a network. In some applications of this technology, the problem of distributing large frequently updated data sets is solved by replacing media data in a streaming video or audio feed distributed by a CDN with continuously updated data table content. The data sets are distributed to resource selection, load balancing and other computing devices. The media data in the feed distributed by the CDN is distributed using a so-called unreliable transport mechanism. By unreliable transport, we adopt the terminology used to describe UDP transport, as opposed to TCP transport, which is referred to as reliable. Thus, among other differences, unreliable transport does not return a confirmation of receipt or require the source to retransmit unacknowledged packages. Applying technology previously disclosed by this assignee, continuous updates to the large data set can be applied with high frequencies such as once a minute, once every 15 seconds, once a second, or as frequently as new samples are received.

Many CDNs are available that efficiently deliver long-lived media streams. The CDNs repurposed by this technology typically deliver Internet-based streaming audio, live TV and video on demand. Examples of streaming services that can benefit from CDNs include Pandora, NBC Olympics, America's Cup World Series, Netflix and YouTube. Container formats for streaming media over these CDNs include Ogg, ASF, QuickTime, RealMedia, Matroska, and DivX Media Format. Additional container formats that have become ISO standards include MPEG transport stream (MPEG TS), MPEG program stream, MP4 and ISO base media file format. Various codecs can be used to encode audio, video and multi-media content and metadata to be delivered in a selected container by a selected CDN. These codecs can be replaced using the technology disclosed, with codecs for either parameter data or augmented content.

The technology disclosed repurposes (or simply uses) the CDNs by substituting parameter data encoders for media content encoders, by filling streaming media containers with parameter data instead of media content. Updated parameter data is provided to the CDN as updates become available, for example in one embodiment updated data is provided to the CDN as frequently as every 1 to 60 seconds. The CDN then supports streaming of the updated parameter data to resource selection, load balancing and computing devices that use the data for various purposes. By streaming we refer to the way many current CDN architectures provide support for client-side, pull-oriented streaming where the client requests media frames from the CDN. This does not preclude support for other streaming architectures, e.g., the CDN pro-actively pushing media frames to clients. The client computing devices include parameter data decoders that extract non-media data from the CDN's streaming media container.

One purpose of streaming parameter data is to improve resource selection or load balancing decisions by using updated resource delivery statistics. Latency and availability of data paths and resources via the Internet varies with time. Streaming of parameter data can keep interested computing devices updated with current sample observations or delivery statistics. The samples or statistics can include availability, capacity and load, or cost. Generally, the parameter data can include any data that subscribing devices use in their selection or other decision making processes. Significant changes in availability, such as consequences of a cut optical cable, can quickly be detected and thus reflected in resource selection decisions.

An example may be instructive. An XYZ Airlines may provide a web site that supports reservations worldwide. As such, XYZ Airlines may have arrangements with multiple CDNs and/or application farms to host static and/or application servers. For example, Akamai and Level 3 Communications might both host content while multiple platform providers such as Amazon, Rackspace, and XYZ Airlines private cloud host application servers. The question of determining which CDN (or CDNs) and/or which platform provider (or providers) should handle a given user's request for the website can have a significant impact on performance. For example for the right resource selection decision for a user from Dubai at 10 pm on this Tuesday may be different from the resource selection decisions (as between CDNs and platform providers) for a user from Egypt just a few minutes earlier.

However, the volume of data needed to enable good decision-making about location-dependent resource selections is massive. Existing CDN capabilities are repurposed, applying the technology disclosed, to deliver the massive data sets used. In some instances, it will be more efficient to deliver combined data sets usable at multiple locations, instead of tailoring data deliveries to each location that receives the data.

While extensive data is used, the data typically is sufficiently redundant to tolerate loss or even substantial data loss. For instance, if the data includes round trip times that are constantly changing by small amounts, most changes in the round trip data values will not change the outcome of decision making Loss of some data points, five percent or even twenty percent of the data points can be tolerated when there is a significant degree of redundancy. Redundancy is also useful because client devices join or rejoin the network at random times. Redundant data transmission reduces the cycle time over which a complete data set becomes available to devices that are added to the network or reinitialized.

Another purpose of streaming parameter data can be content augmentation. Content augmentation can include advertising or augmented reality. Advertising works best when it complements or augments content of interest to a particular user. A CDN can be harnessed to deliver a batch of augmented data usable as advertisements. A CDN also can be used to deliver data for "augmented reality" that enhances a user's understanding of what surrounds the user. For instance, data can augment a view of a street with addresses, names of buildings and directories of building occupants. A CDN can be used to deliver batches of augmentation data as a user updates their location.

This description is focused primarily on reuse of current CDN mechanisms for media delivery systems; however, the techniques herein could be used with other formats supported by CDN delivery methods, systems and articles of manufacture described.

Figure 1:
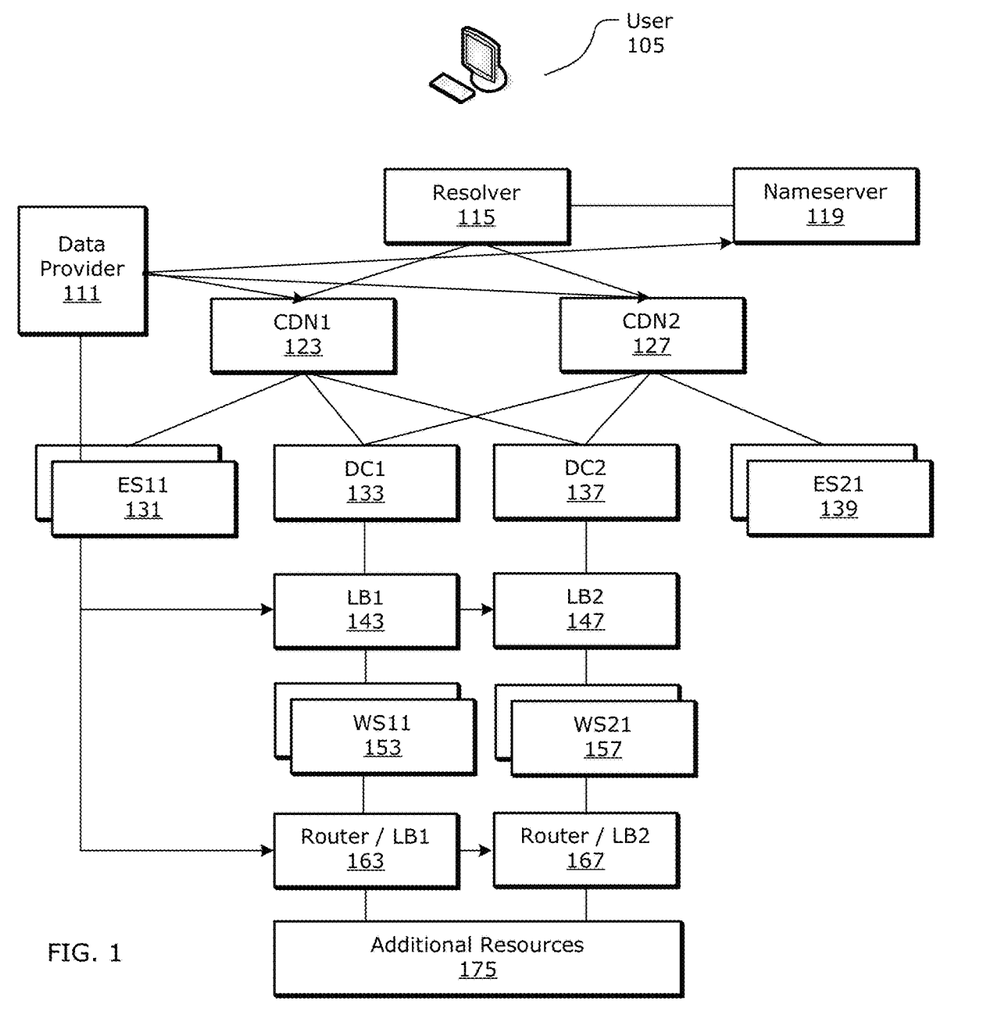
FIGS. 1-2 are examples of environments in which CDN parameter data delivery can be used for resource selection or content augmentation.
Figure 2:
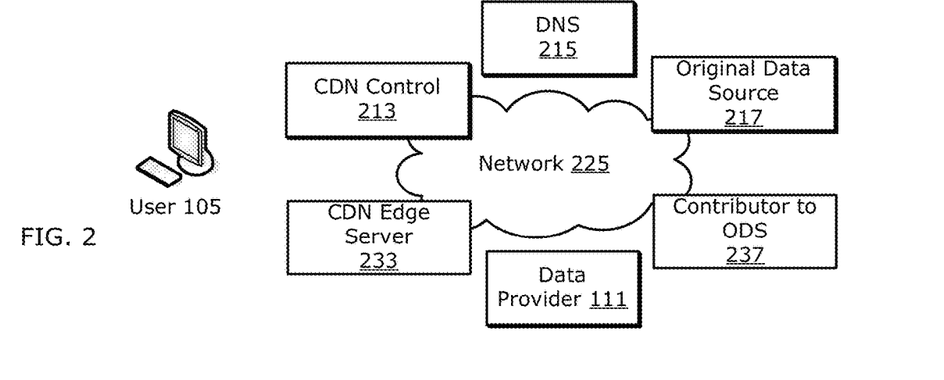

FIGS. 1-2 are examples of environments in which CDN parameter data delivery can be used for resource selection or content augmentation. FIGS. 1-2 are examples of environments in which CDN parameter data can be used for resource selection or content augmentation. FIG. 1 identifies components at various layers of multiple systems. FIG. 2 identifies major systems that cooperate in responding to a user request. Both figures are architectural in nature, as such boxes and connecting lines should be understood to indicate general functionality and inter-relationships between systems as opposed to the underlying physical systems and connection topology.

The components in FIG. 1 span from the user system that issues a request through content delivery networks to data centers that provide original content to the content delivery networks. In response to a request from a user device 105 to reach a website that has contracted with multiple content delivery networks (CDN1 123, CDN2 127), a domain name resolver 115 contacts a name server 119 on behalf of the user. The name server may utilize data from a data provider 111. While this data is illustrated as being delivered directly from the data provider 111 to the name server 119 and other components, it should be understood that the technology used repurposes the CDNs 123, 127 for data delivery from the data provider 111 through the CDNs 123, 127 to ultimate clients such as name server 119, load balancer 143 and router 163. The name server responds to a partially or fully qualified URL by providing an IP address to which the user's request can be routed. Note that the resolver 115 may be software operating on the user device 105 and/or the network of the ISP (not shown) of the user device 105. The name server 119 may use a hosted DNS resolution service, as described in prior applications, or it could receive data from a data distribution service and use that data to resolve the submitted name. The name server 119 may select among multiple content delivery networks 123, 127 or data centers 133, 137 to which the user's request could be resolved. This example indicates that two content delivery networks (CDN1 123, CDN2 127) are available to provide the resources sought by the user device 105. Alternatively, the data centers (DC1 133, DC2 137) might be reached directly by the user 105, without passing through content delivery networks. Also not shown in this figure, but supported are resource selection decisions between platform providers, e.g. Amazon, Rackspace, Windows Azure, Google, and private application servers. The name server 119 presents an initial tier to which parameter data can be distributed for use in resource selection or load-balancing decisions.

Part of a user request may involve obtaining resources from one or more edge servers (ES11 131, ES21 139). A resource selection decision may be involved in selecting an edge server that delivers content with an acceptable response time. Another part of a user request may require obtaining original data from data centers (DC1 133, DC2 137). Edge servers within the CDN may need to obtain data because cached data has expired or because components of a request are not or cannot be cached. The data centers (DC1 133, DC2 137) accessed by the edge servers or directly by the user may initially handle a request, whether from a Web server (WS11 153, WS21 157) or through a load balancer (LB1 143, LB2 147).

A load balancer supports use of multiple instances of Web servers (WS11 153, WS21 157) and spreads requests to be processed among them. The load balancers 143, 147 present a second tier to which the data provider 111 can distribute parameter data for use in decision-making.

Yet another part of a user request may involve obtaining dynamic data, which a Web server 153, 157 in turn needs to obtain from another source. A Web server may be connected through a router (router/LB1 163, router/LB2 167) when it is requesting resources to complete its response to a request. These routers present a third tier to which the data provider 111 can distribute parameter data for use in resource selection. A user request that yields a webpage involves accessing multiple resources, sometimes mixing static and dynamic elements. Responding to user request for a webpage may involve resolving a few URLs or more than a dozen.

FIG. 1 concludes with what we have labeled additional resources 175, highlighting that this is a simplified architectural view and that web pages from one server may refer to or require access to resources from other servers. In addition, dynamic data may need to be retrieved by a Web server in order to respond to a request, involving establishment of a connection to the dynamic data source. All of which are not shown, but are represented by the additional resources 175.

Generally, parameter data useful for resource selection or load-balancing decisions may be used by a variety of computing devices, such as the domain name servers, routers, switches and load-balancing appliances. Similarly, data may be distributed to ad servers that provision ads, either within or across ad delivery networks. In this context, ad servers, optionally collocated with edge servers, can be supplied with ad content based on up-to-date information about users of the edge server. Similarly, augmented reality servers, optionally collocated with the edge servers, can be supplied with reality augmentation content based on up-to-date information locations of about users.

Overall, FIG. 1 shows us that parameter data can be delivered to a variety of decision-making devices in the hierarchy of computer systems that combine in response to a user request. Similarly, augmentation data can be distributed to a variety of server devices.

FIG. 2 is an alternative architectural view of an environment in which CDN-delivered parameter data can be used for resource selection and content augmentation. The main systems in this figure are the user device 105, the network 225, the content distribution network (CDN control 213 and CDN edge server 233), original data sources 217 served through the content distribution network or directly to the user, domain name service components 215 and a data provider 111. The user device 105 requests content, such as a webpage. An IP address for the requested content is supplied by the DNS 215. The DNS is one of the components that can use the new data 245 described in this application. A network 225 connects the user, the domain name services, the new data source and other components. The content delivery network includes at least control 213 and edge server 233 components. The control components may load edge servers 233 with content for delivery. The control components 213 may obtain data from original data sources 217, which may in turn reference contributors to the original data source 237. A variety of domain name servers, routers, switches, load balancers and content targeting devices may be distributed throughout the systems shown in FIG. 2, as discussed in the context of FIG. 1. To make data available to these devices, encoders will prepare the data for distribution and decoders will recover the data.

Figure 3:
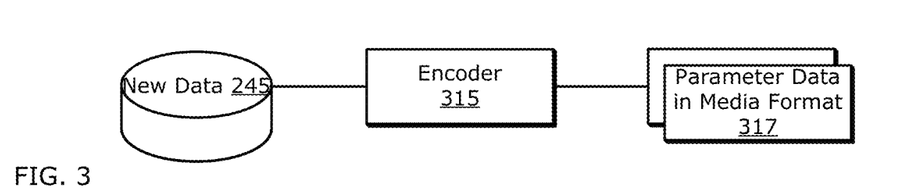
FIG. 3 in an example encoder that encodes non-media data into a media container.

FIG. 3 in an example encoder that encodes non-media data into a media container. For instance, non-media parameter data may summarize or report performance or cost data for point-to-point connections on a network. This encoder 315 that formats new data 245 for delivery in media format packets. That is, a parameter data encoder 315 that is substituted for a media data encoder, in order to repurpose audio or video delivery media packets to carry parameter or content augmentation data.

The following is an example of latency and availability data that could be encoded into media frames or packets for delivery via a CDN. In this example, a record includes the fields:
<zid> <cid> <pid> <tid> <g_mid> <g_cid> <g_asn> <count> <value> <source>
These fields can be defined as follows:
<zid> zone of the provider that the data is being set for
<cid> customer id for the provider
<pid> provider id
<tid> the probe type being set: in the examples below, 0 for round trip time (RTT); 3 is availability percentage; other types available.
<g_mid> geo market location (can span countries)
<g_cid> geo country location (can span autonomous systems)

<g_asn> autonomous system number (can span countries or markets)
<count> the number of reports integrated by this report
<value> for instance, RTT or percentage availability, according to the probe type
<source> address of component supplying data Not all of these fields need to be included in a record. Additional fields not specified also can be provided. The encoder 315 packages parameter data in a format such as this or content augmentation data into a media format 317, such as an audio or video media format. Some examples of data in the format specified follow. To set a RTT for private provider 1/10590/1992 from Europe/France/OVH to 200 milliseconds, use the data:
1 10590 1992 0 3 70 16276 1 200 192.168.2.23

To set RTT for communicating through public provider 24 (Edgecase) from another device located same network to 2 milliseconds
0 0 24 0 3 70 16276 1 2 192.168.2.23

To set availability of a private provider to 91 percent:
1 10590 1992 3 3 70 16276 1 91 192.168.2.23

To set availability of a public provider to 75 percent:
0 0 24 3 3 70 16276 1 75 192.168.2.23

Collectively, a large number of these or other data samples can be used to construct one or more sparse matrices or other data structures that a computing device can use to make resource selection or load sharing decisions. Over time, newer sample points are given more weight than older sample points. This can be accomplished, for instance, by applying arithmetic or exponential decay, as new samples are integrated into the matrix.

Similarly, content augmentation data such can be encoded by the encoder technology described.

The target of the encoder is a frame that the content delivery network will deliver without generating an error. For instance, the target may be a NAL unit of a frame of H.264-compliant data. In one implementation, an otherwise unassigned NAL unit type code is assigned and the encoder places parameter data in the NAL unit of a H.264-compliant frame, instead of audio or video data. The NAL unit type code can be, for instance, one of the unspecified NAL unit type values 0 or 24-31 or one of the reserved values 21-23. One or more (typically many) data samples are blocked into a single NAL unit. The length of the resulting NAL unit is determined and set as part of the H.264 media frame. Use of an otherwise unused NAL unit type causes any media decoder that might receive the frame to ignore it and not be confused by the appearance of parameter data in place of valid audio or video media data. In another implementation, one or more of the specified and assigned values 1-20 could be assigned the NAL unit. In both implementations, care should be taken that the resulting frame of data is packaged in a way that the CDN will deliver without generating an error. The CDN will use its expertise in delivering media content to support rapid delivery of the media packet carrying disguised parameter data. Still other embodiments may operate at the transport stream (TS) level, e.g. encoding valid MPEG TS data packets with non-media data types.

A typical CDN provides a variety of services that can be leveraged when delivering parameter data. The CDN is designed to keep open long-lived sessions, in contrast to typically short-lived web server sessions. The CDN handles authentication of delivery point and required accounting. Rapidly refreshed and even live streaming data are immediately prepared for delivery. The CDN can respond quickly, opening a new stream and queuing new data in a second or less. These services and capabilities can be leveraged to deliver parameter data or augmented content to subscribing computer devices that have specially designed decodes that can extract the parameter data or augmented content from media containers.

Figure 4:
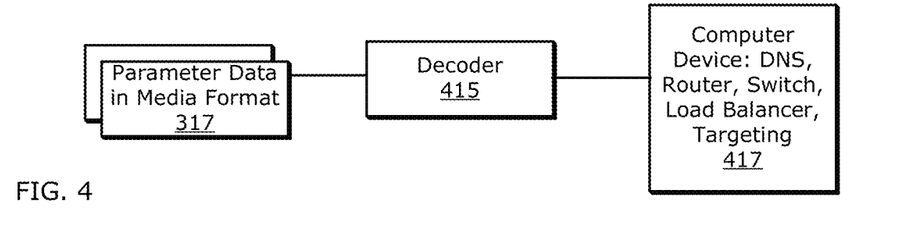
FIG. 4 in an example computing device with a decoder that decodes non-media data from a media container.

FIG. 4 in an example decoder that decodes non-media data from a media container. The media container is part of a media stream delivered electronically by the CDN. The parameter data in a media container 317 is the output of the encoder. The decoder 415 recognized the media container or frame as containing non-media data and applies its non-media decoding to the data 317. The decoder itself may be part of a computing device that uses the decoded data, such as a domain name server, router, switch, load balancer or ad targeting appliance. Or, it may be run on a separate device that distributes the decoded data to one or more computing devices.

Figure 5:
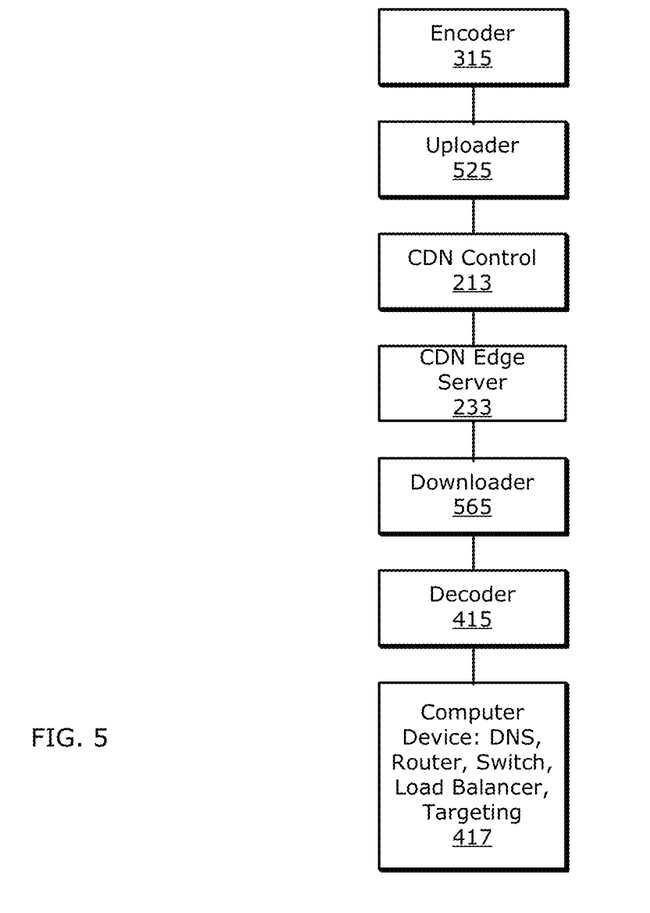
FIG. 5 in an example depicting a system with an encoder, CDN uploader, CDN streaming media delivery platform and a computing device with a decoder. These components can be combined to deliver up-to-date data that can be used for resource selection.

FIG. 5 in an example depicting a system with an encoder, CDN uploader, CDN streaming media delivery platform and a computing device with a decoder. These components can be combined to deliver up-to-date data that can be used for resource selection. The encoder 315 and decoder 415 may be the components described in the context of FIGS. 3-4. The CDN control 213 and edge server 233 may be the components described in the context of FIG. 2. Introduced in this figure are components that upload parameter data or augmented content to the CDN 525 and download the same from the CDN. These components can be adapted from existing software, because the media containers or frames can be treated by the CDN as streaming media. Refinement to the CDN handling of non-media data in media containers or frames can be adopted within the scope of and consistent with this disclosure. Ultimately, the data is delivered to its destination 417. Parameter data can be delivered to a DNS, route switch or load balancer. Augmented content can be delivered to a content cache or a content targeting device.

Figure 6:
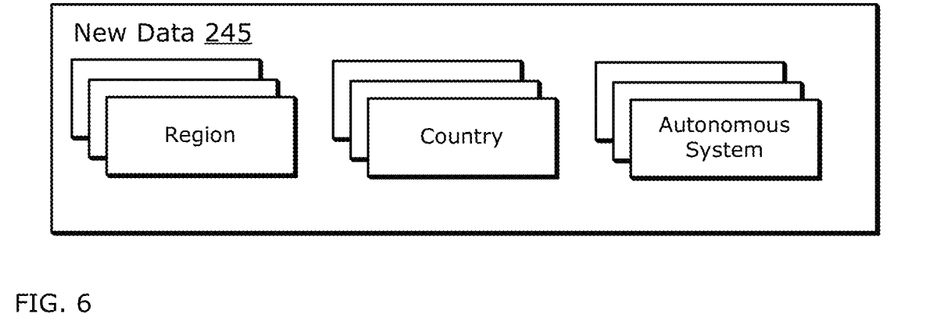
FIG. 6 illustrates individual streams of parameter data to which interested computer systems can subscribe.

FIG. 6 illustrates individual streams of parameter data to which interested computer systems can subscribe. New data 245 is segmented from data collected using previously disclosed approaches. A computing device 417 subscribes to a segment of data, such as data for a region, a country, a provider or an autonomous system (AS). For some subscriptions, the data volume may be closer to the volume carried by a single streaming audio channel. For a large subscription, multiple data segments can be packaged onto a larger stream such as a single video channel or multiple steam video transport stream. Technologies for media streaming span a wide range of bandwidths that can be scaled as needed.

Figure 7:
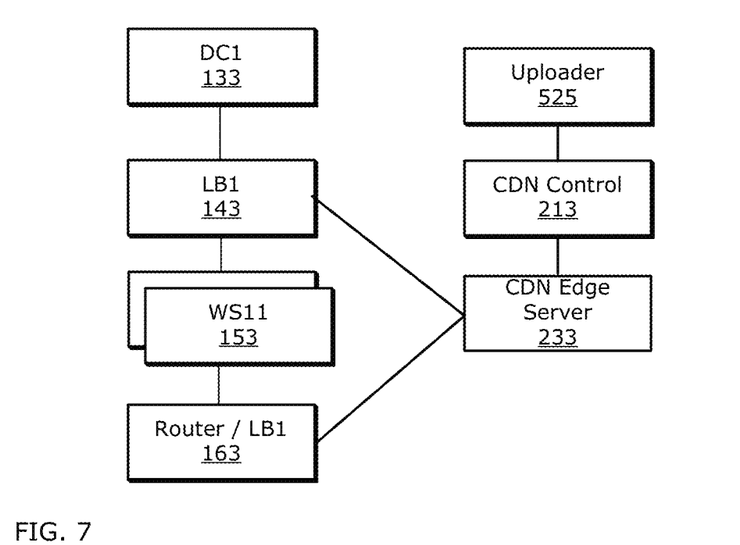
FIG. 7 in an example of CDN parameter data delivery for resource selection.

FIG. 7 in an example of a CDN for parameter data delivery for resource selection. In this example, the CDN edge server 233 is supplying data to one or more load balancers 143 or routers/load balancers 163. In the data center 133, the initial load balancer 143 may select among web servers 153 hosted at the data center or elsewhere. The web servers 153 may, in turn, connect with one or more backend systems or contributors that supply data responsive to requests. When multiple instances of the systems or contributors are available, a router or load balancer 163 may select a resource. Both the initial load balancer 143 and the router or load balancer 163 may receive parameter data from the CDN edge server 233 and use the parameter data when selecting a resource.

Figure 8:
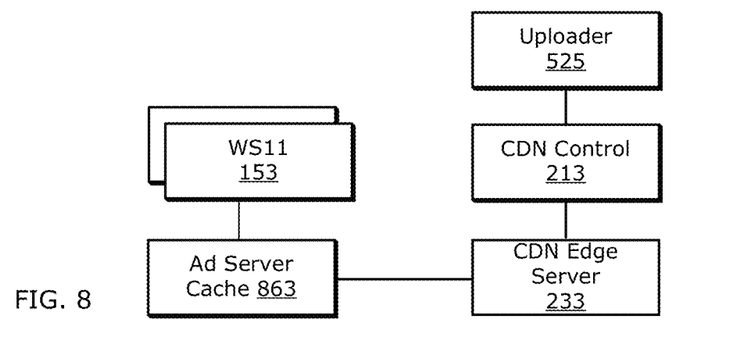
FIG. 8 in another example of CDN parameter data delivery, this time for augmented content.

FIG. 8 in another example of CDN parameter data delivery, this time for augmented content.

Figure 9:
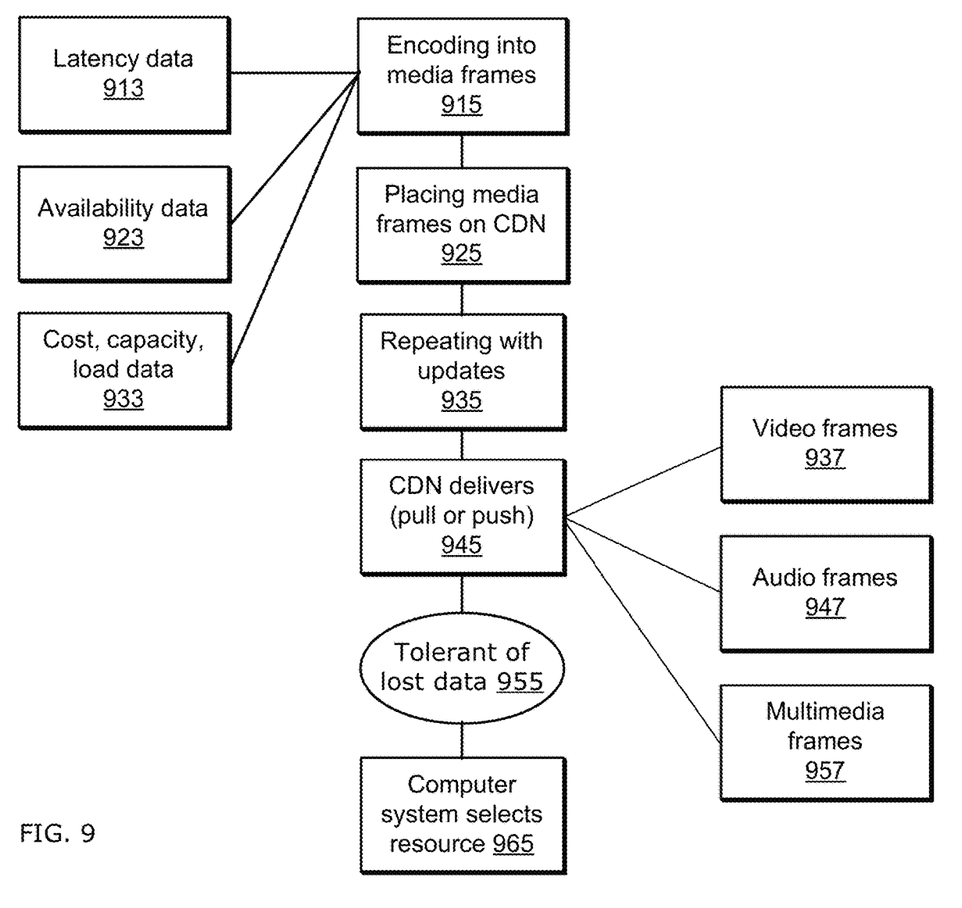
FIG. 9 is an example flow chart of CDN data delivery.

FIG. 9 is an example flow chart of CDN data delivery. In this example, the parameter data types are latency data 913, availability data 923, cost, capacity and load data 933. More generally, such parameter data may summarize or report performance or costs for point-to-point connections on a network. An origin point may group many users into a single origin, to summarize point-to-point connections. The parameter data is encoded into media frames 915, such as MPEG frames 937, audio frames 947, or multimedia frames 957. The encoded media frames are placed on one or more CDNs 925 for delivery to subscribing computing devices. The media frames are placed onto the CDNs repeatedly, with updated data 935. Updated data can be supplied periodically or as values change. The updated data can be redundant, as described above. The CDN delivers the frames of data 945. The delivery typically is on demand, in a so-called pull mode. It can operate in a CDN-push mode, if preferred. Redundancy in the data over time makes the CDN delivery tolerant of lost data 955. Using whatever data it receives, a computing device that subscribes to the data feed uses the parameter data to select resources 965. When the parameter data is replaced with augmented content, the final step will be the computing device using the augmented content. For instance, the computing device may deliver ads or may annotate an augmented reality display.

Figure 10:
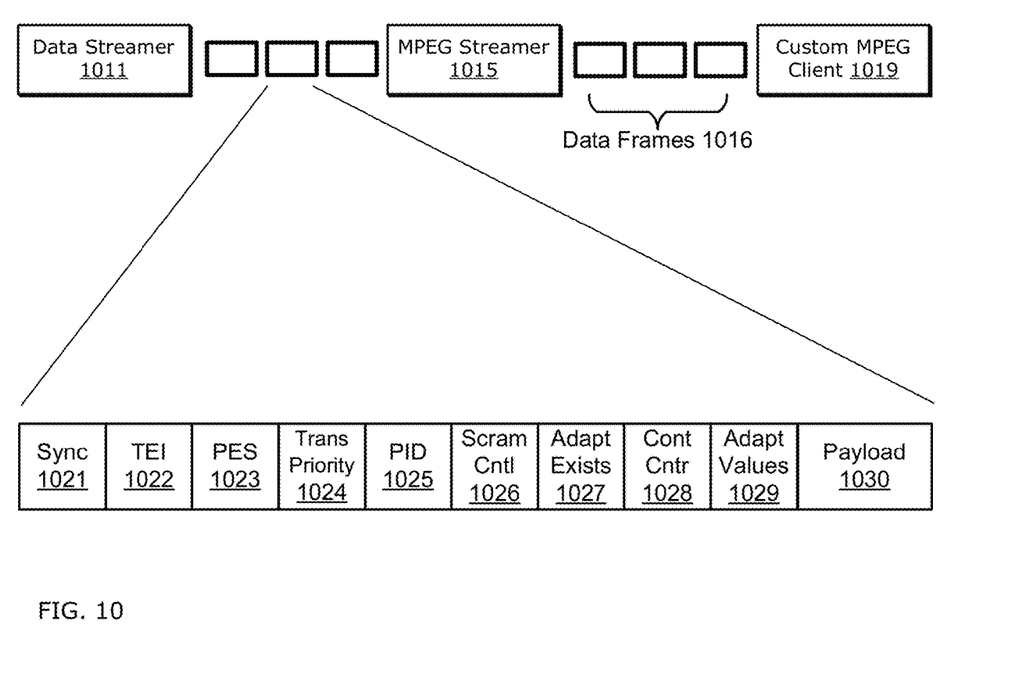
FIG. 10 is an example format in which parameter delivery is carried in an MPEG stream.

FIG. 10 is an example format in which parameter delivery is carried in an MPEG Transport Stream (TS). Data frames 1016 are carried from a data streamer 1011 to an MPEG streamer 1015 and onto a custom MPEG decoder client 1019. The data streamer 1011 can be the data provider 111 in FIG. 1. The MPEG streamer 1016 can be the CDN 123, 127. A custom MPEG client 1019 on the subscribing computer device processes packets in the MPEG TS to extract the desired parameter data.

In one implementation, an individual data frame 1016 follows the field format of fields 1021-1030. In this implementation, the parameter data is packed into the caption part of the video, which does not experience compression, scaling or bit format variation that sometimes applies to the content part of the data. A transport packet, carried in an MPEG TS has a packet ID (PID) 1025 that identifies the channel to which the packet belongs. Parameter data can be carried in the payload data field 1030. Other fields 1021-24 and 1026-29 can be used as appropriate and consistent with parts of the MPEG TS protocol. In this example implementation, the custom MPEG client 1019 will use the PID 1025 to filter the desired packets in a stream and extract parameter (or augmentation) data from the payload data field 1030.

Some Particular Implementations

In one implementation, a method of distributing large, frequently updated non-media data sets to a computer system is described that includes encoding at least parts of a non-media data set for delivery in video or audio media frames via a streaming media content delivery network that uses unreliable transport. The video or audio media frames may comply with the standard body imposed format or streaming media. The method further includes placing the media frames on the content delivery network for delivery to the computer system and, then, repeating the encoding and placing actions with updates to the non-media data set.

This method and other implementations the technology disclosed can each optionally include one or more the following features and/or features described in connection with additional methods disclosed. In the interest of conciseness, the features disclosed in this application are not individually enumerated and repeated with each base set of features. The reader will understand how features identified in this section can readily be combined with sets of base features identified as implementations.

The method can further include relying on the content delivery network to deliver the media frames responsive to one or more requests from a subscribing computer system.

Applying the method, the non-media data set can include updated latency sample data that contribute to a sparse matrix of point-to-point connection performance that assists a computing device that subscribes to the updates to the non-media data set in selecting among alternative resources responsive to a user request. The non-media data performance data can include updated availability sample data, updated capacity and load sample data, and/or cost data that contribute to the sparse matrix and assist the computing device in selecting among alternative resources. Two, three, or more of these several sample data types can be can combined. In general, it can include any performance or cost related data that assists a computing device that subscribes to the updates to the non-media data set in selecting among alternative resources responsive to a user request.

At least some parts of the non-media data set can be incrementally updated with an average update period of 1 to 15 seconds. The average update period can be 15 to 60 seconds. Updates to individual elements of the non-media data set can be performed as quickly as samples are received, in milliseconds. At least some parts of the non-media data set can be updated from data samples received continuously, with an average period of one to one-thousand microseconds.

Applying this method, updated samples contributing to the non-media data set can be encoded and placed on the content delivery network frequently enough that randomly distributed loss of five percent of the updated samples before delivery to devices that subscribe to the updates is statistically insignificant to four nines (99.99 percent accurate). That is, as a statistical matter assuming a normal distribution, statistics compiled even in the face of data loss amounting to one in 20 samples will, on average, be within $\frac{1}{100}$ of a percent of the statistics that would be compiled with complete data.

More generally, embodiments making use of data delivered (or retrieved) in this fashion can be highly tolerant of lost data. For example, instead of trying to request all the missing data, a device such as computing device 417 that misses a few seconds or even minutes of data could in some embodiments ignore the missing data. More specifically, this would mean that in the pull-delivery configuration, the missing media frames for the time period would not be requested from the CDN.

In some implementations, the non-media data set includes updated latency data about a plurality of media CDNs, not limited to the content delivery network that distributes the non-media data set, and data for the plurality of media CDNs is packaged as a plurality of streams with per-stream subscriptions.

In other implementations, the non-media data set includes updated performance data about a plurality of media CDNs, not limited to the content delivery network that distributes the non-media data set, and data for the plurality of media CDNs is packaged as a plurality of streams with per-stream subscriptions.

In various implementations, the non-media data set includes updated performance data about a plurality of cloud computing resource providers and data for the plurality of cloud computing resource providers is packaged as a plurality of streams with per-stream subscriptions.

In some implementations, the non-media data set includes updated performance data about a plurality data centers and data for the plurality of data centers is packaged as a plurality of streams with per-stream subscriptions. A method could deliver non-media data regarding media CDNs, cloud computing resource providers and data centers.

Applying any of these methods, the video or audio frames can be format-compliant with a standard established by a standard-setting body for streaming media. For instance, the video or audio media frames can be compliant with a MPEG transport stream standard.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

Another set of methods can be framed from the perspective of an encoder that replaces a media encoder to place non-media data in a video or audio media container. Media data include video or audio data. These are the principal forms of streaming data. Media data are interpretable by a processor to reproduce or contribute to the reproduction of video or audio signals. By non-media data, we mean data that is not subject to interpretation by a processor to reproduce or contribute to reproduction of video or audio signals.

In some implementations, a method is described of preparing parameter data for streaming to computing devices. This method includes receiving a plurality of parameter data points that contribute to a sparse matrix of parameter data, wherein the parameter data does not represent part of a video or audio signal. The method further includes repeatedly encoding blocks of the parameter data points using a processor to encapsulate them in a selected video or audio media container format. It also includes forwarding a stream of frames in the selected media container format that contain the encoded blocks of the parameter data points.

This method and other implementations the technology disclosed can each optionally include one or more the following features and/or features described in connection with additional methods disclosed.

In some implementations, the method further includes placing the frames of parameter data on a content delivery network for retrieval by or delivery to a computing device. In this sense, placing the frames of parameter data on the CDN is agnostic as to whether push or pull technology results in delivery of the data to a subscribing computer device. Subscribing computer devices include, for instance, domain name servers, routers, switches, load balancers, content targeting devices and targeted content caches.

The method may further include encoding the parameter data points into a selected unit type of the media container format. And, generating a stream of frames including additional unit types consistent with the selected media container format that enable the stream to be forwarded and received by transport components designed to process media streams in the selected media container format.

In some implementations, the parameter data expresses updated samples of performance of point-to-point connections on a network. The samples may express latency of the point-to-point connection, availability of the point-to-point connection, capacity and load of at least one device in the point-to-point connection, and/or cost of using the point-to-point connection. In general, it can include any performance or cost related data that assists a computing device that subscribes to the updates to the non-media data set in selecting among alternative resources responsive to a user request.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

Another encoder implementation describes a method of preparing data for streaming to computing devices that includes receiving a stream of updated data for delivery to subscribing computer devices, wherein the updated data does not represent part of a video or audio signal. It further includes repeatedly encoding blocks of the updated data point using a processor into a selected video or audio media container format. It also includes forwarding a stream of frames in the selected media container format that contain encoded blocks of the updated data.

This method and other implementations the technology disclosed can each optionally include one or more the following features and/or features described in connection with the encoder implementation above. For the sake of conciseness, those features are not repeated here.

In these implementations, the updated data can include augmented content. The augmented content can include advertising and/or augmented reality data.

In some implementations, the augmented content can be targeted to one or more users coupled in connection with a computing device that subscribes to the stream of frames.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

The technology disclosed also can include methods described from the perspective of a content distribution network. One implementation describes a method that includes repeatedly receiving updates to a non-media data set encapsulated in media frames at a content delivery network server and caching the media frames for distribution. Further includes receiving from at least one subscriber at least one request for at least part of the non-media data set and, responsive to the request, transmitting at least one stream of the media frames via a network to a requesting device, wherein the stream includes at least some of the encapsulated updates to the non-media data set.

This method and other implementations the technology disclosed can each optionally include one or more the following features and/or features described in connection with additional methods disclosed.

In some implementations of this method, the media frames are packaged to be essentially non-cacheable by intermediary devices positioned in the Internet along routes between one or more content delivery network servers and a multitude of requesting devices. For instance, the media frames can be marked non-cashable. Fields are units of the media stream can be encoded uniquely to prevent a cache hit.

Some implementations further include, accompanying the request for the non-media data set received by the content delivery network, receiving authentication of one or more requesting devices and determining the requesting devices' authorization to receive the parts of the non-media data set.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

The technology disclosed also applies to decoders and methods for decoding. In one implementation, a method is described of preparing parameter data received in a media stream for use in decision making by a computing device. This method includes receiving a stream of frames in a selected video or audio media container format that includes blocks parameter data that contribute to a sparse matrix of parameter data, wherein the parameter data does not represent part of a video or audio signal. It further includes repeatedly decoding the blocks of the parameter data points using a processor from the selected video or audio container format and forwarding a plurality of the parameter data points for incorporation in the sparse matrix of parameter data.

This method and other implementations the technology disclosed can each optionally include one or more the following features and/or features described in connection with additional methods disclosed. In particular, features of encoding find complementary features in decoding.

In some implementations, the method further includes retrieving or receiving the frames over a network from a content delivery network.

In some implementations, the parameter data points are decoded from a particular unit type within the media container. These implementations may further include filtering from the stream additional unit types of the media container format that do not contain parameter data.

In some implementations, the parameter data expresses updated samples of performance of point-to-point connections on a network. The samples may express latency of the point-to-point connection, availability of the point-to-point connection, capacity and load of at least one device in the point-to-point connection, and/or cost of using the point-to-point connection. In general, it can include any performance or cost related data that assists a computing device that subscribes to the updates to the non-media data set in selecting among alternative resources responsive to a user request.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

Another to encoder implementation describes a method of preparing data received in a media stream for use in decision making by a computing device. This method includes receiving a stream of frames in a selected video or audio media container format that includes blocks of updated data, wherein the updated data does not represent part of a video or audio signal. It further includes repeatedly decoding the blocks of the updated data using a processor from the selected video or audio container format and forwarding at least part of the updated data to a subscribing computer component.

This method and other implementations the technology disclosed can each optionally include one or more the following features and/or features described in connection with additional methods disclosed. In particular, many of the features of the above described decoder method applied to this method as well.

In some implementations, the updated data includes augmented content. The augmented content can include advertising or augmented reality data.

In some implementations, the augmented content is targeted to one or more users coupled in communication with the subscribing computer component.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

The technology disclosed also can be considered from the perspective of a downstream device that receives makes use of data encapsulated in video or audio media containers. One implementation describes a method of receiving at least parts of a large, frequently updated non-media data set. This method includes receiving a stream of video or audio media frames via a content delivery network that uses unreliable transport. Further includes decoding at least parts of a non-media data set from the stream of media frames and updating, using the extracted non-media data, a data structure accessible to a receiving device that is used for by the receiving device for decision making.

This method and other implementations the technology disclosed can each optionally include one or more the following features and/or features described in connection with additional methods disclosed. In particular, features of decoding may be operative on a downstream device or with the method executed by a downstream device.

In some implementations, a method includes receiving a request to select among alternative resources to fulfill a request. It further includes selecting among the alternative resources using data in the data structure and responding to the request by identifying the selected resource.

In some implementations, the method further includes receiving a request to provide data to support selection among alternative resources to fulfill a Web-directed content request. It can further include accessing the data structure and retrieving responsive data and responding to the request with the responsive data.

In other implementations, the method can further include logging into the content delivery network and subscribing to receive at least parts of the non-media data set.

The non-media data set can include updated latency sample data, availability sample data, capacity and load sample data, and/or cost data that contribute to a sparse matrix of point-to-point routing performance. In general, it can include any performance or cost related data that assists a computing device that subscribes to the updates to the non-media data set in selecting among alternative resources responsive to a user request.

At least some parts of the non-media data set can be incrementally updated with an average update period of 1 to 15 seconds. The average update period can be 15 to 60 seconds. Updates to individual elements of the non-media data set can be performed as quickly as samples are received, in milliseconds. At least some parts of the non-media data set can be updated from data samples received continuously, with an average period of one to one-thousand microseconds.

Applying this method, updated samples contributing to the non-media data set can be encoded and placed on the content delivery network frequently enough that randomly distributed loss of five percent of the updated samples before delivery to devices that subscribe to the updates is statistically insignificant to four nines (99.99 percent accurate). That is, as a statistical matter assuming a normal distribution, statistics compiled even in the face of data loss amounting to one in 20 samples will, on average, be within 1/100 of a percent of the statistics that would be compiled with complete data.

In some implementations, the non-media data set includes updated latency data about a plurality of media CDNs, not limited to the content delivery network that distributes the non-media data set, and data for the plurality of media CDNs is packaged as a plurality of streams with per-stream subscriptions.

In other implementations, the non-media data set includes updated performance data about a plurality of media CDNs, not limited to the content delivery network that distributes the non-media data set, and data for the plurality of media CDNs is packaged as a plurality of streams with per-stream subscriptions.

In various implementations, the non-media data set includes updated performance data about a plurality of cloud computing resource providers and data for the plurality of cloud computing resource providers is packaged as a plurality of streams with per-stream subscriptions.

In some implementations, the non-media data set includes updated performance data about a plurality data centers and data for the plurality of data centers is packaged as a plurality of streams with per-stream subscriptions. A method could deliver non-media data regarding media CDNs, cloud computing resource providers and data centers.

Applying any of these methods, the video or audio frames can be format-compliant with a standard established by a standard-setting body for streaming media. For instance, the video or audio media frames can be compliant with a MPEG transport stream standard.

Other implementations may include a system with memory and one or more processors operable to execute instructions, stored in memory, to perform methods and aspects of benefits as described above. Other implementations may include a non-transitory computer readable storage medium storing instructions executable on a processor to perform any such methods.

We claim as follows:

1. A method of distributing large, frequently updated non-media data sets to a computer system, including:
    encoding at least latency sample data for delivery in video or audio media frames of a media stream via a streaming media content delivery network (CDN) that uses a first transport protocol, wherein the latency sample data pertains to a plurality of media CDNs including at least one media CDN that is distinct from the streaming media CDN;
    wherein the encoded latency sample data is inserted in a payload portion of the video or audio media frames of the media stream;
    wherein the first transport protocol does not return a confirmation of receipt and also does not require retransmission of unacknowledged packages;
    placing the media frames on the streaming media content delivery network for delivery to the computer system; and
    repeating the encoding and placing actions with updates to the latency sample data;
    wherein the computer system is configured to make a selection of a particular media CDN of the plurality of media CDNs based on a matrix comprising the latency sample data, and values of the matrix correspond to respective pairs of sources and destinations of the plurality of media CDNs.

2. The method of claim 1, further including relying on the streaming media content delivery network to deliver the media frames responsive to one or more requests from a subscribing computer system.

3. The method of claim 1, wherein the updates to the latency sample data are performed periodically at an average period of 1 to 15 seconds.

4. The method of claim 1, wherein the latency sample data includes updated latency sample data about a plurality of cloud computing resource providers and the updated latency sample data about the plurality of cloud computing resource providers is packaged as a plurality of streams with per-stream subscriptions.

5. The method of claim 1, wherein the latency sample data includes updated latency sample data about a plurality data centers and the updated latency sample data about the plurality of data centers is packaged as a plurality of streams with per-stream subscriptions.

6. The method of claim 1, wherein the placed media frames are marked non-cacheable.

7. The method of claim 1, wherein the latency sample data is updated with an average period between successive updates of 15 to 60 seconds.

8. A method of distributing large, frequently updated non-media data sets, including:
    repeatedly receiving updates to latency sample data encapsulated as payload within first media frames at a content delivery network (CDN) edge server and caching the first media frames for distribution;
    receiving from at least one subscriber at least one request for the updated latency sample data;
    responsive to the at least one request, transmitting, from the CDN edge server, at least one stream of second media frames via a network to a requesting device, wherein the at least one stream includes at least some of the updated latency sample data, encapsulated as payload within the second media frames; and
    receiving, from the requesting device, a selection of a resource, from among a plurality of resources, based on a sparse matrix comprising the at least some of the updated latency sample data.

9. The method of claim 8, wherein the second media frames are marked non-cacheable to indicate that they should not be cached by intermediary devices positioned in the Internet along routes between the content delivery network edge server and the requesting device.

10. The method of claim 8, further including, accompanying the request for the updated latency sample data, receiving authentication of the requesting device and determining the requesting device's authorization to receive the updated latency sample data.

11. The method of claim 8, wherein the updated latency sample data pertains to a plurality of media CDNs, including at least one media CDN distinct from the CDN edge server.

12. The method of claim 8, wherein the updates are received periodically with an average period of 15 to 60 seconds.

13. A method of forwarding parameter data received in a media stream for use in decision making by a computing device, the method including:
    receiving a stream of media frames in a selected video or audio media container format that includes, in payload portions of the media frames, blocks of parameter data representing inputs to a sparse matrix of measured performance data of point-to-point connections, wherein the parameter data comprise delivery statistics, and do not represent part of a video or audio signal;

repeatedly decoding the blocks of parameter data, using a processor, from the selected video or audio media container format;

forwarding a plurality of data points of the blocks of parameter data for incorporation in the sparse matrix; and receiving from the computing device a selection of a given content delivery network (CDN) among a plurality of CDNs, the selection being determined based on the sparse matrix.

14. The method of claim 13, wherein the parameter data expresses updated samples of delivery statistics performance of point-to-point connections on a network.

15. A system that distributes large, frequently updated non-media data sets, the system including:

a processor coupled to memory, wherein the memory includes program instructions that, when executed, cause the processor to:

encode at least availability data for delivery in standard body-specified video or audio media frames of a media stream via a streaming media content delivery network (CDN) that uses a first transport protocol, wherein the availability data pertains to a plurality of media CDNs including at least one media CDN that is distinct from the streaming media CDN;

wherein the encoded availability data is inserted in payload portions of the video or audio media frames of the media stream;

wherein the first transport protocol does not return a confirmation of receipt and also does not require retransmission of unacknowledged packages;

place the media frames on the streaming media content delivery network for delivery to a computer system;

repeat the encoding and placing actions with updates to the availability data; and receive, from the computer system, a selection of a particular media CDN of the plurality of media CDNs, wherein the selection is based on a sparse matrix comprising the availability data, and wherein values of the sparse matrix represent pairs of sources and destinations of the plurality of media CDNs.

16. The system of claim 15, wherein the placed media frames are marked non-cacheable.

17. One or more non-transitory computer readable storage media that store program instructions that, when run on one or more processors:

encode at least delivery statistics of point-to-point connections, for delivery in standard body-specified video or audio media frames via a streaming media content delivery network (CDN) that uses a first transport protocol, wherein the delivery statistics pertain to a plurality of media CDNs including at least one media CDN that is distinct from the streaming media CDN;

wherein the encoded delivery statistics are inserted within payload of the video or audio media frames of the media stream;

wherein the first transport protocol does not return a confirmation of receipt and also does not require retransmission of unacknowledged packages;

place the media frames on the streaming media content delivery network for delivery to a computer system;

repeatedly encode and place the media frames on the streaming media content delivery network with updates to the delivery statistics; and receive, from the computer system, a selection of a particular media CDN of the plurality of media CDNs, wherein the selection is based on a matrix comprising the delivery statistics of the point-to-point connections and values of the matrix represent pairs of sources and destinations of the plurality of media CDNs.

18. The system of claim 17, wherein the delivery statistics are updated periodically with an average period between updates of 15 to 60 seconds.

19. A system that distributes large, frequently updated non-media data sets, the system including:

a processor coupled to memory, wherein the memory includes program instructions that, when executed, cause the processor to:

repeatedly receive updates to availability data of point-to-point connections, encapsulated within payload portions of first media frames at a content delivery network (CDN) edge server, and cache the first media frames for distribution;

receive from at least one subscriber at least one request for the updated availability data;

responsive to the at least one request, transmit, from the CDN edge server, at least one stream of second media frames via a network to a requesting device, wherein the at least one stream includes at least some of the encapsulated updated availability data, encapsulated within payload portions of the second media frames; and receive, from the requesting device, a selection of a particular media CDN of a plurality of media CDNs, wherein the selection is based on a matrix comprising the at least some of the encapsulated updated availability data of the point-to-point connections and values of the matrix represent pairs of sources and destinations of the plurality of media CDNs.

20. The system of claim 19, wherein the availability data is updated periodically with an average period between successive updates of 15 to 60 seconds.

21. The system of claim 19, wherein the processor is a first processor, the memory is a first memory, and the program instructions are first program instructions, and further comprising:

a second processor coupled to a second memory storing second program instructions that, when executed, cause the second processor to:

receive the availability data transmitted from the CDN edge server; and incorporate the received availability data into the matrix of the availability data of the point-to-point connections.

* * * * *